(12) United States Patent
Uemura

(10) Patent No.: US 9,594,530 B2
(45) Date of Patent: Mar. 14, 2017

(54) IMAGE FORMING APPARATUS

(71) Applicant: KYOCERA Document Solutions Inc., Osaka (JP)

(72) Inventor: Shizuya Uemura, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 15/053,496

(22) Filed: Feb. 25, 2016

(65) Prior Publication Data
US 2016/0253131 A1 Sep. 1, 2016

(30) Foreign Application Priority Data

Feb. 26, 2015 (JP) .................. 2015-037401
Nov. 20, 2015 (JP) .................. 2015-227808

(51) Int. Cl.
*G06F 3/12* (2006.01)
*H04N 1/00* (2006.01)

(52) U.S. Cl.
CPC ............ *G06F 3/1211* (2013.01); *G06F 3/126* (2013.01); *G06F 3/1207* (2013.01); *G06F 3/1259* (2013.01); *G06F 3/1285* (2013.01); *H04N 1/0032* (2013.01); *H04N 1/00204* (2013.01); *H04N 1/00689* (2013.01); *H04N 1/00694* (2013.01); *H04N 2201/0094* (2013.01)

(58) Field of Classification Search
CPC ...... G06F 3/1285; G06F 3/1288; G06F 3/126; G06F 3/1263; G06F 3/1259; H04N 1/00204; H04N 2201/3205; H04N 1/00233; H04N 2201/3215; H04N 1/00923; H04N 1/32502; H04N 2201/0094; H04N 1/00222

USPC ..... 358/1.15, 1.14, 1.13, 1.16, 1.9, 1.2, 400, 358/442, 443, 448; 399/82, 79, 8, 81, 9, 399/10, 24, 298, 40, 80, 87; 709/229
See application file for complete search history.

(56) References Cited

U.S. PATENT DOCUMENTS

| | | | | |
|---|---|---|---|---|
| 2002/0030851 A1* | 3/2002 | Wanda | .................. | G06F 3/1285 358/1.15 |
| 2004/0141201 A1* | 7/2004 | Shima | .................. | H04L 43/067 358/1.15 |
| 2004/0160613 A1* | 8/2004 | Kurotsu | ............... | G06F 3/1212 358/1.1 |
| 2005/0174599 A1* | 8/2005 | Ferlitsch | ............... | G06F 3/1206 358/1.15 |

(Continued)

FOREIGN PATENT DOCUMENTS

JP    H11-203096 A    7/1999

*Primary Examiner* — Negussie Worku
(74) *Attorney, Agent, or Firm* — IP Business Solutions, LLC

(57) ABSTRACT

An image forming apparatus is connected to a plurality of computers via a network, and the image forming apparatus which spools and sequentially processes each of jobs received from the plurality of computers includes: a job management section receiving and managing the jobs transmitted from the computers; and a control section, upon reception of a new job from the computer by the job management section, calculating a scheduled end time of the new job based on a number of prints required for executing the new job, a print speed of the image forming apparatus, and a scheduled end time of the job on standby, and notifying the calculated scheduled end time to the computer which has transmitted the new job.

6 Claims, 7 Drawing Sheets

(56) References Cited

U.S. PATENT DOCUMENTS

| | | | | |
|---|---|---|---|---|
| 2006/0139690 | A1* | 6/2006 | Yagita | G06F 3/1204 358/1.15 |
| 2007/0133033 | A1* | 6/2007 | Mizutani | G06F 21/608 358/1.14 |
| 2008/0075496 | A1* | 3/2008 | Okamoto | G03G 21/14 399/77 |
| 2009/0252524 | A1* | 10/2009 | Morooka | G03G 15/5087 399/82 |
| 2010/0245900 | A1* | 9/2010 | Morimoto | G06F 3/1222 358/1.15 |
| 2010/0328699 | A1* | 12/2010 | Tsuji | G06F 1/3268 358/1.14 |
| 2012/0206761 | A1* | 8/2012 | Uotani | G06F 3/1203 358/1.15 |
| 2013/0050760 | A1* | 2/2013 | Sakuragi | G06F 3/1213 358/1.15 |
| 2014/0268216 | A1* | 9/2014 | Soriano | G06K 15/1803 358/1.15 |
| 2014/0355050 | A1* | 12/2014 | Sakai | G06F 3/1204 358/1.15 |
| 2015/0062623 | A1* | 3/2015 | Yano | G06F 3/1213 358/1.15 |
| 2016/0127592 | A1* | 5/2016 | Nakamura | H04N 1/00923 358/1.13 |

* cited by examiner

IMAGE FORMING APPARATUS

INCORPORATION BY REFERENCE

This application claims priority to Japanese Patent Application No. 2015-037401 filed on Feb. 26, 2015, and Japanese Patent Application No. 2015-227808 filed on Nov. 20, 2015, the entire contents of which are incorporated by reference herein.

BACKGROUND

This disclosure relates to an image forming apparatus, and more specifically to a technology of notifying an accurate scheduled job end time.

An image forming apparatus such as a printer or a multifunction peripheral is connected to a plurality of computers via a network such as a LAN, and can be shared by the plurality of computers. In such an image forming apparatus, jobs are transmitted from the plurality of computers at a time in a concentrated manner in some cases, in which cases the jobs get stacked and much time is required until end of printing for the job finally received. As a result, even when a user who has transmitted the final job goes to the image forming apparatus to take a printed material, he or she has to wait until completion of print processing of the jobs of other users.

Known as such a technology is, for example, a job management technology of, in a printing system where a plurality of printing devices (corresponding to image forming apparatuses) and a higher-level device such as a computer are connected through a network, constantly calculating a period until completion of a job in execution or on standby in each printing device and transmitting, to the higher-level device, a print completion time based on results of the this calculation.

SUMMARY

As one aspect of this disclosure, a technology obtained by further improving the technology described above will be suggested.

An image forming apparatus according to one aspect of this disclosure refers to an image forming apparatus connected to a plurality of computers via a network. The image forming apparatus includes: an image formation section, and a processor.

The image formation section performs image formation based on the jobs.

The processor implements function as a job management section and a control section.

The job management section receiving and spooling each of jobs received from the plurality of computers and managing each of the jobs.

The control section sequentially processing the jobs managed by the job management section.

Upon reception of a new job from any one of the plurality of computers by the job management section, based on a number of prints required for executing the new job, a print speed of the image forming apparatus, and a scheduled end time of the spooled job on standby, the control section calculates a scheduled end time at which the new job ends, and notifies the calculated scheduled end time to the computer which has transmitted the new job.

DETAILED DESCRIPTION

Figure 1:
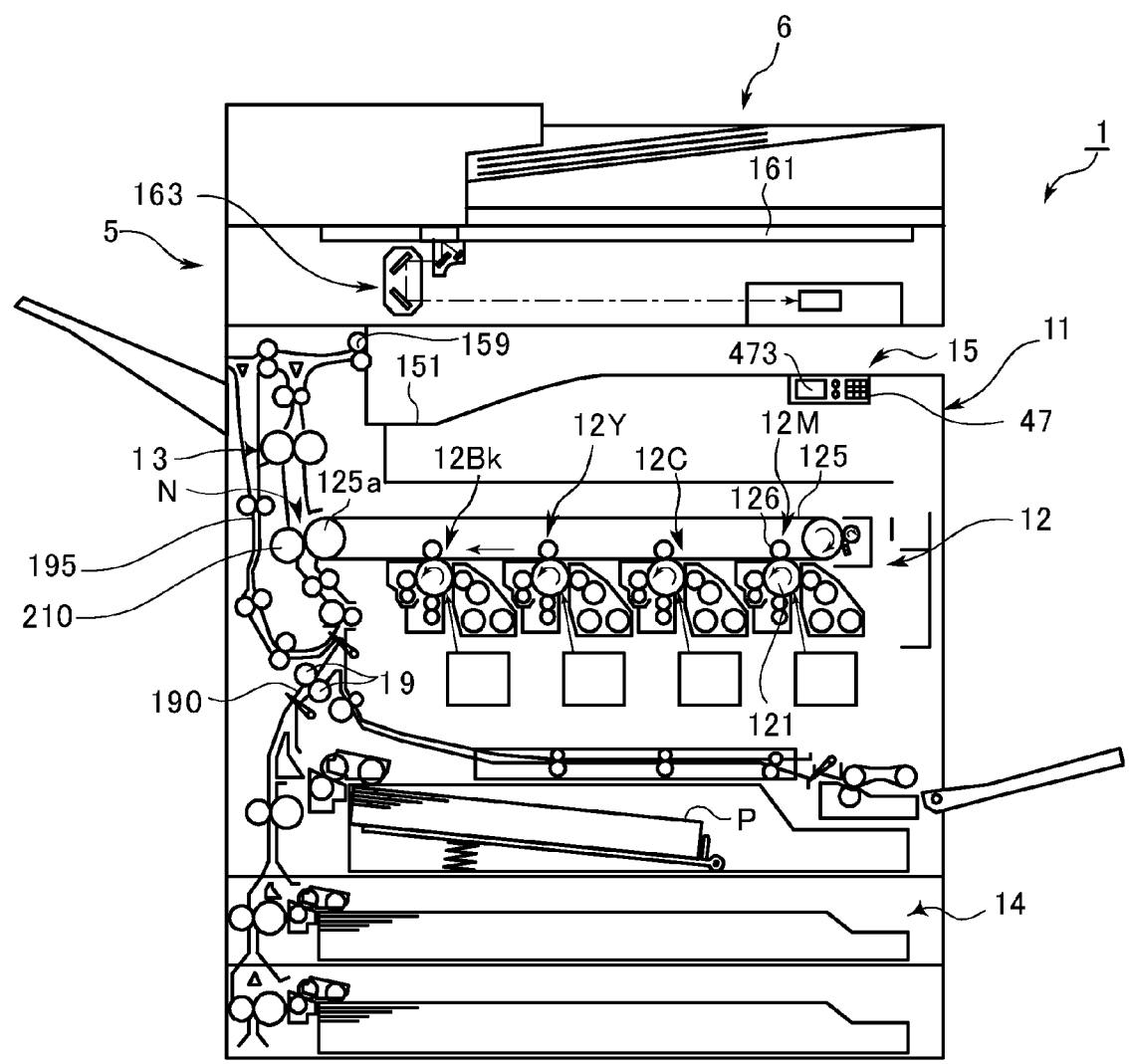
FIG. 1 is an elevation sectional view showing a structure of an image forming apparatus according to one embodiment of this disclosure.

Hereinafter, an image forming apparatus according to one embodiment of this disclosure will be described with reference to the drawings. FIG. 1 is an elevation sectional view showing a structure of the image forming apparatus according to one embodiment of this disclosure.

The image forming apparatus 1 according to one embodiment of this disclosure is a multifunction peripheral combining together a plurality of functions such as, for example, a copy function, a printer function, a scanner function, and a facsimile function. The image forming apparatus 1 includes in an apparatus body 11: an operation section 47, an image formation section 12, a fixing section 13, a paper feed section 14, a document feed section 6, a document reading section 5, etc.

The operation section 47 receives, from an operator, for example, an image formation operation execution instruction and a document reading operation execution instruction for various operations and processing executable by the image forming apparatus 1. The operation section 47 includes a display section 473. The display section 473 is formed of a liquid crystal display (LCD) having a touch panel function.

Upon the document reading operation performed by the image forming apparatus 1, an image of a document fed by the document feed section 6 or a document loaded on document loading glass 161 is optically read by the document reading section 5 whereby image data is generated. The image data generated by the document reading section 5 is saved into, for example, a built-in HDD or a network-connected computer.

Upon the image formation operation performed by the image forming apparatus 1, based on, for example, the image data generated through the document reading operation described above, the image data received from the network-connected computer, or the image data stored in the built-in HDD, the image formation section 12 forms a toner image on paper P as a recording medium fed from the paper feed section 14. Upon performance of color printing, a magenta image formation unit 12M, a cyan image formation unit 12C, an yellow image formation unit 12Y, and a black image formation unit 12Bk of the image formation section 12, based on an image of respective color components composing the image data described above, respectively form toner images on photoconductive drums 21 through charging, exposure, and development processes, and transfer the toner images onto an intermediate transfer belt 125 by a primary transfer roller 126.

The aforementioned toner images of the respective colors transferred on the intermediate transfer belt 125 are superposed on a top of another on the intermediate transfer belt 125 through transfer timing adjustment, turning into a color toner image. A secondary transfer roller 210, at a transfer nip N formed with a driving roller 125a with the intermediate transfer belt 125 in between, transfers this color toner image, which has been formed on a surface of the intermediate transfer belt 125, onto the paper P conveyed from the paper feed section 14 through a conveyance path 190. Then the fixing section 13 fixes, onto the paper P, the toner image on the paper P through thermal compression. The paper P on which the color image has already been formed and then has already been subjected to the fixing processing is discharged to a discharge tray 151.

In the image forming apparatus 1, upon performance of duplex printing, the paper P on one side of which the image has been formed by the image formation section 12 is nipped by a discharge roller pair 159, then this paper P is switched back by the discharge roller pair 159 and delivered to an inverted conveyance path 195, and is conveyed again to a region upstream of the transfer nip N and the fixing section 13 described above in a direction in which the paper P is conveyed by a conveyance roller pair 19. As a result, an image is formed on another side of this paper by the image formation section 12.

Figure 2:
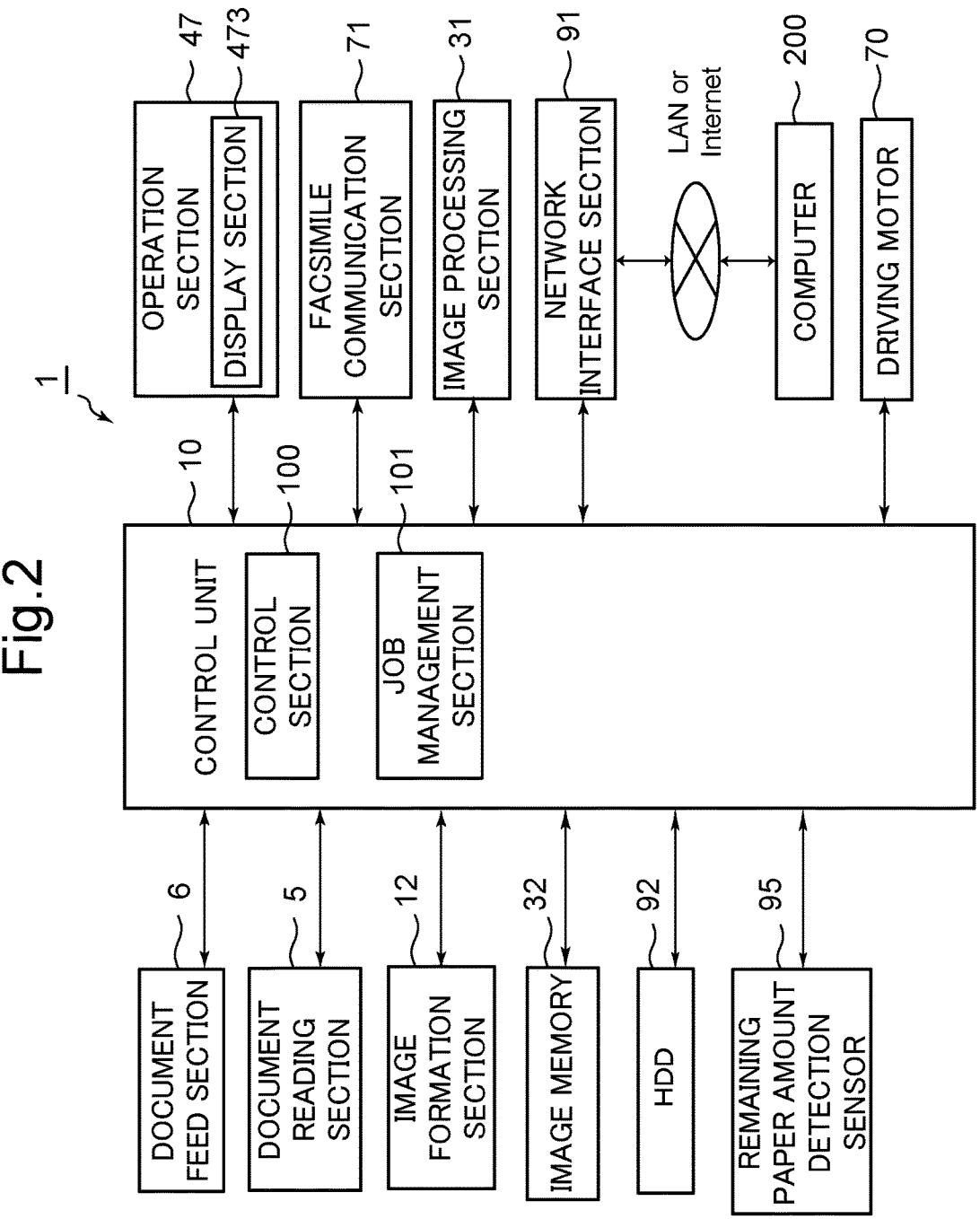
FIG. 2 is a functional block diagram showing main inner configuration of the image forming apparatus.

Next, configuration of the image forming apparatus 1 will be described. FIG. 2 is a functional block diagram showing main inner configuration of the image forming apparatus 1.

The image forming apparatus 1 includes a control unit 10 as a processor. The control unit 10 is composed of: a central processing unit (CPU), a RAM, a ROM, a dedicated hardware circuit, etc., and is in charge of overall operation control of the image forming apparatus 1.

The document reading section 5 includes a reading mechanism 163 (see FIG. 1) having a light irradiation section, a CCD sensor, etc. under control by the control unit 10. The document reading section 5 irradiates a document with light by the light irradiation section and receives reflective light thereof with the CCD sensor to thereby read an image from the document.

An image processing section 31 performs image processing on the image data of the image read at the document reading section 5 when necessary. For example, the image processing section 31, for the purpose of quality improvement after the image read by the document reading section 5 is subjected to image formation by the image formation section 12, performs predefined image processing such as shading correction.

An image memory 32 is a region where data of a document image obtained through reading by the document reading section 5 is temporarily stored and where data to be printed at the image formation section 12 is temporarily saved.

The image formation section 12 performs image formation on print data read at the document reading section 5, print data received from the network-connected computer 200, etc.

The operation section 47 receives, from the operator, instructions for the various operations and processing executable by the image forming apparatus 1. The operation section 47 includes the display section 473.

The display section 473 provides various displays such as an operation screen, a preview screen, and a job status confirmation screen when the image forming apparatus 1 is in a normal operation mode. On the other hand, the display section 473 turns itself off when the image forming apparatus 1 is in a sleep mode.

A facsimile communication section 71 includes an encoding/decoding section, a modulation and demodulation section, and a network control unit (NCU) (not shown), and performs facsimile transmission by use of a public phone network.

A network interface section 91 is formed of a communication module such as a LAN board, and performs transmission and reception of various pieces of data to and from, for example, a computer 200 in a local area via, for example, a LAN connected to this network interface section 91. To the image forming apparatus 1, a plurality of computers 200 can be connected.

A hard disc drive (HDD) 92 is a high-capacity storage device which stores, for example, the document image read by the document reading section 5.

A driving motor 70 is a driving source which provides a rotational driving force to each rotary member of the image formation section 12, the conveyance roller pair 19, etc.

The control unit 10 implements function as a control section 100 and a job management section 101.

The control section 100 is connected to: the document reading section 5, the document feed section 6, the image processing section 31, the image memory 32, the image formation section 12, the operation section 47, the facsimile communication section 71, the network interface section 91, the HDD 92, etc., and performs driving controls of these sections.

The job management section 101 receives a job transmitted from the computer 200, and manages the job by, for example, determining job print order. The job includes print data and a series of processing commands for this data.

The control section 100 executes each job, which is managed by the job management section 101, in accordance with the aforementioned print order determined by the image forming apparatus 101. Then upon reception of a new job from the computer 200 by the job management section 101, the control section 100 calculates a scheduled end time at which execution of this job ends. At this point, the control section 100 calculates the scheduled end time of the new job based on a number of prints required for executing the new job, a print speed (PPM: page per minute) of the image forming apparatus 1, and a scheduled end time of any job on standby. Then the control section 100 notifies the calculated scheduled end time of the new job to the computer 200 which has transmitted this new job. The computer 200 which has received this notification can notify the scheduled job end time to the user through, for example, hop-up display on the display.

For example, if no job is on standby, based on the number of prints required for executing the new job and the print speed of the image forming apparatus 1, the control section 100 calculates a scheduled end period required for executing this new job. For example, where the number of prints of the new job is n and the print speed of the image forming apparatus 1 is m, the control section 100 calculates that n/m minutes is required from start of the job execution to its end. The control section 100 defines, as the scheduled end time of this job, a time of end timing at which the job is expected to end n/m minutes after a time at a time point at which printing of a first page of this job has started.

If there is any job on standby for which the scheduled end time has been calculated as described above, since the scheduled end time of each job has already been calculated, the control section 100 calculates the scheduled end time of the new job by adding the scheduled end period of this new job, which has been calculated based on the number of prints of the new job and the print speed of the image forming apparatus 1, to the scheduled end time of the final job on standby.

A remaining paper amount detection sensor 95 is, for example, an optical sensor having a light emission section and a light reception section. The remaining paper amount detection sensor 95 outputs, to the control section 100, a period from a time point at which the light emission section emits light to the loaded paper P from above the paper P on the paper feed cassette of the paper feed section 14 to a time point at which the light reception section receives reflective light from this paper P. Based on a period until the time point at which the light reception section receives this reflective light, a thickness of one piece of the preset paper P, etc., the control section 100 calculates a number of pieces of paper P, that is, a remaining amount of paper stored in the paper feed cassette. That is, the control section 100 detects the remaining amount of paper by use of an output from the remaining paper amount detection sensor 95. Thus, the control section 100 and the remaining paper amount detection sensor 95 are each one example of a remaining paper amount detection section in the scope of the claims.

Figure 3:
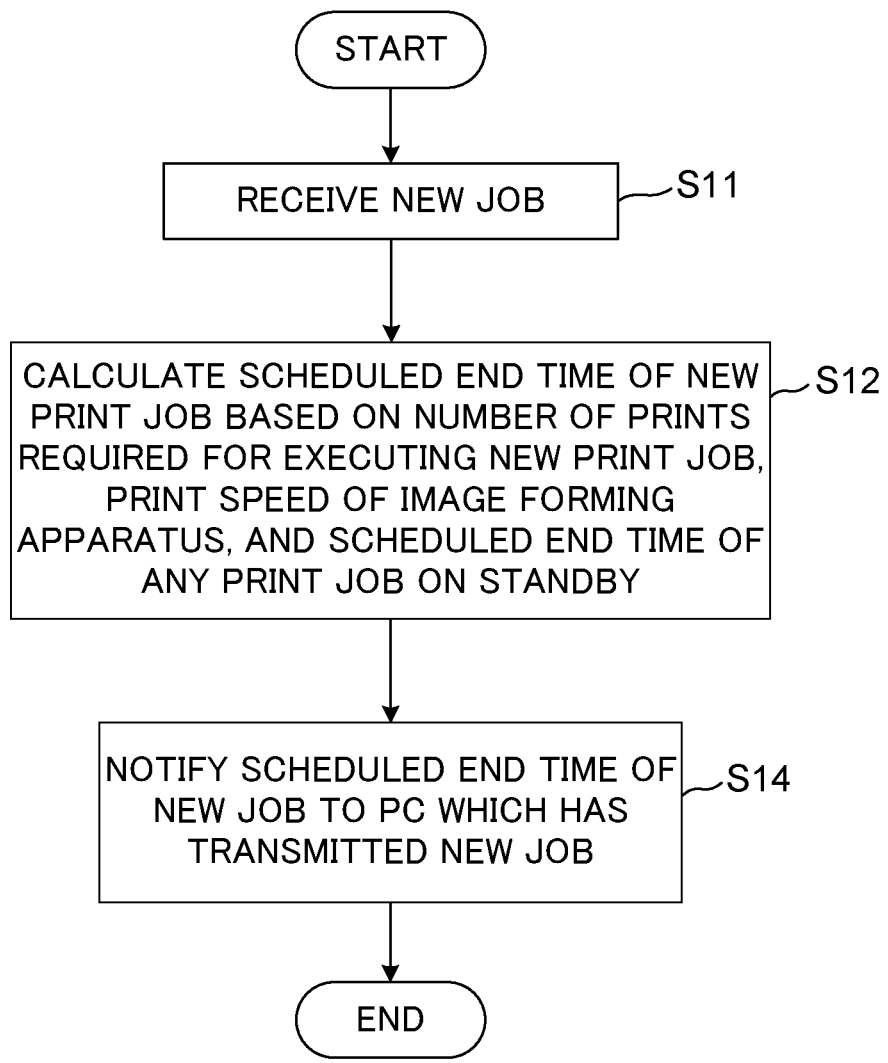
FIG. 3 is a flowchart showing processing of notifying a scheduled job end time by the image forming apparatus according to a first embodiment.

Next, a first embodiment of processing of notifying a scheduled job end time by the image forming apparatus 1 will be described. FIG. 3 is a flow chart showing the first embodiment of the processing of notifying the scheduled job end time by the image forming apparatus 1.

Upon transmission of a new job from the computer 200, the job management section 101 receives this new job and registers it into a print queue (S11).

The control section 100 calculates a scheduled end time of this new job in the manner described above, based on the number of prints required for executing the new job received by the job management section 101, the print speed of the image forming apparatus 1, and the scheduled end time of any job on standby (S12).

Then the control section 100 notifies the scheduled end time of this new job, via the network interface section 91, to the computer 200 which has transmitted this new job (S14).

Figure 4:
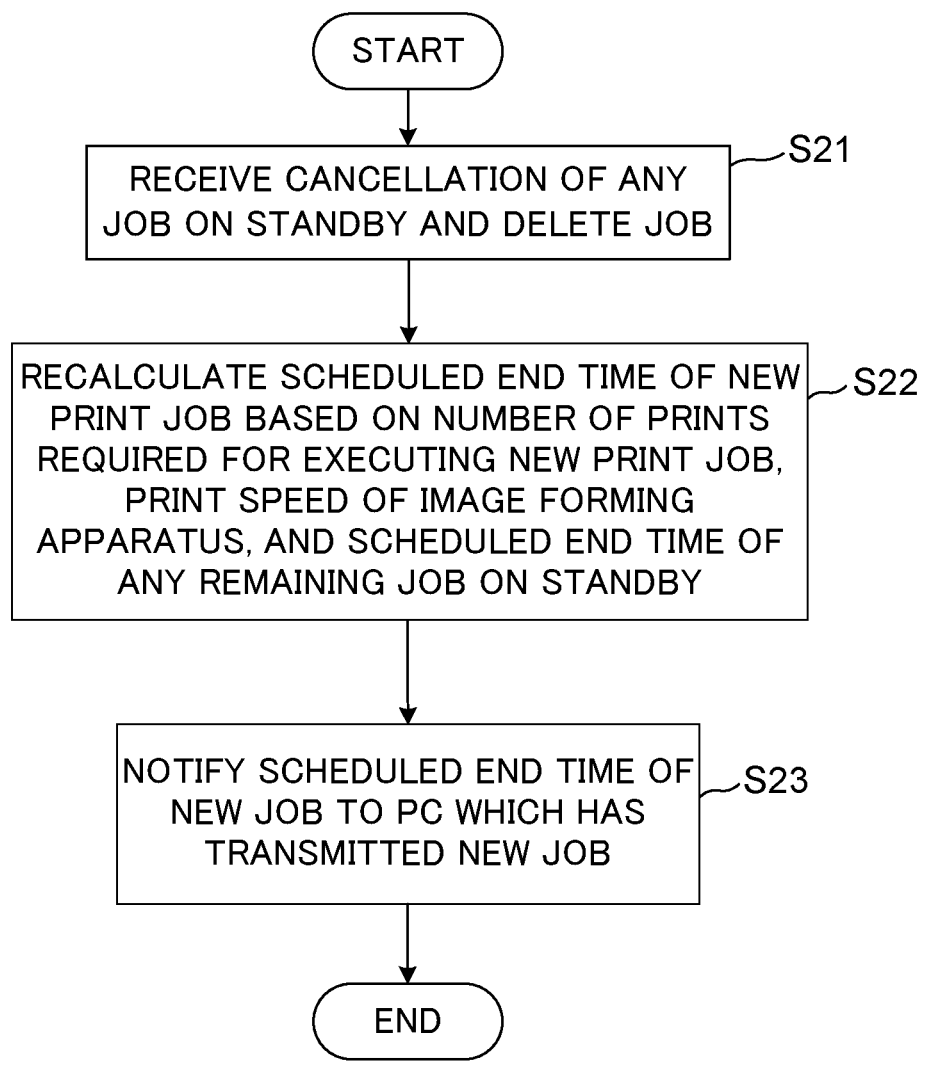
FIG. 4 is a flowchart showing processing of notifying a scheduled job end time upon job cancellation.

Next, processing of recalculating a scheduled end time of each job upon cancellation of any other job on standby will be described. FIG. 4 is a flow chart showing processing of notifying a scheduled job end time upon the job cancellation.

Upon the cancellation of any other job on standby, a scheduled end time of any job located later in the aforementioned print order than this cancelled job is moved earlier. Therefore, in such a case, the control section 100 recalculates a scheduled end time of the job whose scheduled end time is to be moved earlier.

Upon transmission of cancellation of any other job on standby from the computer 200, the job management section 101 receives this cancellation and eliminates the job to be cancelled from the print queue (S21).

For each job located later in the aforementioned print order than this canceled job, based on the number of prints required for executing each of the jobs received by the job management section 101, the print speed of the image forming apparatus 1, and the scheduled end time of any job on standby, control section 100 recalculates a scheduled end time of each of the jobs described above (S22).

For example, upon cancellation of the second job in a state in which three jobs have been registered in a print queue and the first job is in execution, a calculated print end period required for executing the second job is subtracted from a scheduled job end time of the second job, and adding a scheduled end period of the third job to a time obtained through the subtraction, that is, the scheduled end time of the first job, thereby recalculating a scheduled end time of the third job located later in the aforementioned print order than the canceled job.

Then the control section 100 notifies the scheduled end time of this new job calculated again in S22 to the computer 200 which has transmitted the job for which the scheduled end time has been recalculated (S23).

Figure 5:
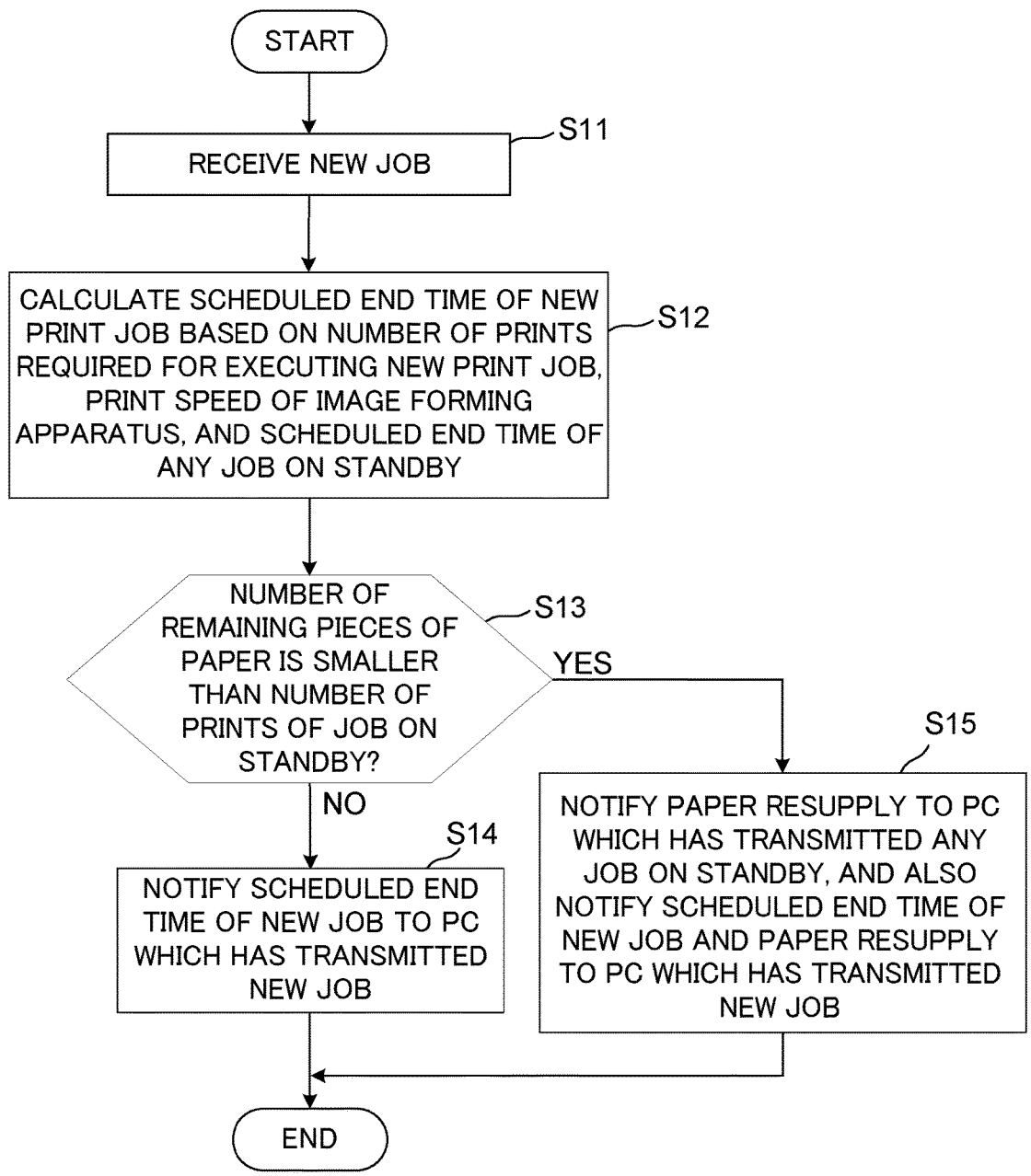
FIG. 5 is a flowchart showing processing of notifying a scheduled job end time by the image forming apparatus according to a second embodiment.

Next, a second embodiment of the processing of notifying a scheduled job end time by the image forming apparatus 1 will be described. FIG. 5 is a flow chart showing the second embodiment of the processing of notifying a scheduled job end time by the image forming apparatus 1.

In the processing of notifying a scheduled job end time shown in the flow chart of FIG. 3, along with the calculation of the scheduled end time of the new job described above, the control section 100 may confirm whether or not a sufficient amount of paper P used in the print processing of the job remains in the paper feed section 14. This second embodiment is obtained by, in addition to the first embodiment described above, adding processing of confirming a remaining pieces of paper to the processing of notifying a scheduled job end time.

Upon transmission of a new job from the computer 200, the job management section 101 of the image forming apparatus 1 receives this new job and registers it in a print queue (S11).

The control section 100 calculates a scheduled end time of this new job based on a number of prints required for executing the new job received by the job management section 101, the print speed of the image forming apparatus 1, and a scheduled end time of any other job on standby (S12).

Moreover, the control section 100 makes comparison between a remaining amount of paper at this time point calculated based on an output from the remaining paper amount detection sensor 95, that is, a number of remaining pieces of paper stored in the paper feed section 14 and a number of prints required for executing all the jobs including any other job on standby and the aforementioned new job, and upon judgment that the number of remaining pieces of paper in the paper feed section 14 is smaller than the number of prints required for executing all the jobs (YES in S13), notifies information indicating necessity of paper resupply to the computer 200 which has transmitted any other job on standby, and together with the scheduled end time of the new job, notifies the information indicating the necessity of paper resupply to the computer 200 which has transmitted this new job (S15). In this manner, in a case where the number of remaining pieces of paper in the image forming apparatus 1 is smaller than the number of prints required for executing any job on standby, the paper resupply is notified to each of the computers 200 which has transmitted the new job and the computer 200 which has transmitted any other job on standby, thereby making it possible to urge the user, who is waiting for printing, to perform the paper resupply.

In S15, the information indicating the necessity of paper resupply is notified to both the computer 200 which has transmitted any job on standby and the computer 200 which has transmitted the new job. Alternatively, the information indicating the necessity of paper resupply may be notified to at least either one of the computer 200 which has transmitted any job on standby and the computer 200 which has transmitted the new job. This can also urge the user of the computer 200, to which the information indicating the necessity of paper resupply has been notified, to perform the paper resupply.

On the other hand, if the number of remaining pieces of paper in the image forming apparatus 1 is larger than the number of prints for any job on standby (NO in S13), the control section 100 notifies the scheduled end time of this new job to the computer 200 which has transmitted this new job without notifying the paper resupply described above to any computer 200 (S14).

Figure 6:
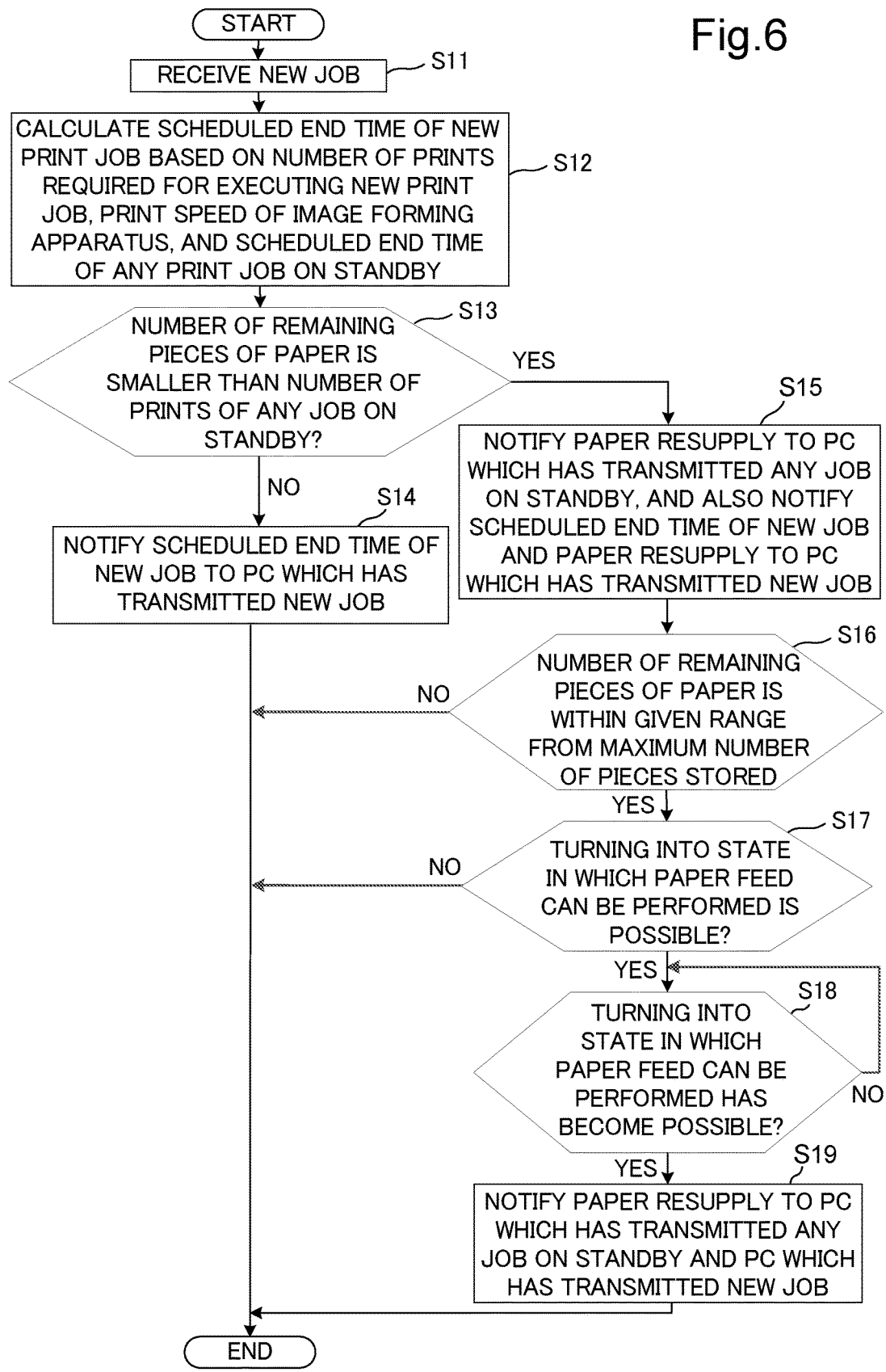
FIG. 6 is a flowchart showing processing of notifying a scheduled job end time by the image forming apparatus according to a third embodiment.

Next, a third embodiment of the processing of notifying a scheduled job end time by the image forming apparatus 1 will be described. FIG. 6 is a flow chart showing the third embodiment of the processing of notifying the scheduled job end time by the image forming apparatus 1. In the third embodiment, the same processing as that of the second embodiment will be omitted from the description.

In this third embodiment, in addition to the processing of the second embodiment, processing shown below is further performed. Upon notification of the necessity of paper resupply to the computer 200 which has transmitted any other job on standby and notification of the scheduled end time of this new job and the necessity of paper resupply to the computer 200 which has transmitted the new job (S15), the control section 100 further judges whether or not the number of remaining pieces of paper stored in the paper feed section 14 which number has been detected in S13 above is a value within a given range from predefined maximum pieces (for example, 500 pieces) (for example, within a range between a number 10 pieces smaller than the maximum number of pieces and the maximum number of pieces) (S16).

Here, upon judgment that that the number of remaining pieces of paper detected in S13 above is a value within the given range from the predefined maximum number of pieces (YES in S16), when the jobs managed by the job management section 101 have been sequentially executed, the control section 100 judges whether or not the image forming apparatus 1 can turn into a state in which paper feed can be performed (S17). If NO in S16, the processing ends.

As processing in S17, the control section 100 first analyzes contents of each job managed by the job management section 101, and extracts any job not accompanied by the processing (here, a print operation) performed by the image formation section 12. The jobs not accompanied by the processing performed by the image formation section 12 include: for example, a scan job, a fax transmission job, etc. If the control section 100 cannot extract any job not accompanied by the processing performed by the image formation section 12 since there is none, the control section 100 judges that the image forming apparatus 1 cannot turn into the state in which paper feed can be performed (NO in S17). If NO in S17, the processing ends.

Upon extraction of any job not accompanied by the processing performed by the image formation section 12, the control section 100 calculates a required period necessary for processing this extracted job. For example, in a case where the extracted job is a scan job, based on a reading speed of the document reading section 5 and a number of documents read by the document reading section 5, the control section 100 calculates a required period necessary for completing this job. Moreover, in a case where the extracted job is a fax transmission job, based on the reading speed of the document reading section 5, the number of documents ready by the document reading section 5, and a required fax transmission period, the control section 100 calculates the required period necessary for completing this job. Upon extraction of a plurality of jobs which are not accompanied by the processing performed by the image formation section 12 and which are consecutive in execution order, the control section 100 defines, as the aforementioned required period, a total of periods required for completing the respective jobs.

Then upon judgment that the calculated required period above has not reached a predefined period (for example, 60 seconds), the control section 100 judges that the image forming apparatus 1 cannot turn into the state in which the paper feed can be performed (NO in S17).

On the other hand, upon judgment that the calculated required period above has reached the predefined period, the control section 100 judges that the image forming apparatus 1 can turn into the state in which the paper feed can be performed (YES in S17).

Moreover, also in a case where an execution moment of the extracted job described above is later than a time point at which the number of remaining pieces of paper described above becomes deficient as a result of execution of the job accompanied by the processing performed by the image formation section 12, the control section 100 may judge that the image forming apparatus 1 cannot turn into the state in which the paper feed can be performed (NO in S17).

If YES in S17, the control section 100 starts execution of processing of each of the jobs managed by the job management section 101, upon reach of a moment at which the execution of the processing of the extracted job described above starts while these jobs are sequentially processed, the control section 100 judges, that, as a result of this, the image forming apparatus 1 has turned into the state in which the paper feed can be performed (YES S18). Then at a time point at which the execution of the processing of this extracted job starts, the control section 100 notifies a message urging paper resupply to the computer 200 which has transmitted any other job on standby and the computer 200 which has transmitted this new job (S19).

In this case, the control section 100 may notify the message urging the paper resupply to at least either one of the computer 200 which has transmitted any job on standby and the computer 200 which has transmitted the new job. Also by this notification, motivation for the paper resupply can be given to the user.

Even in a case where the paper feed section 14 has been drawn out from the apparatus body 11 after this notification in S19, the control section 100 does not discontinue but continue the processing of each job in execution. This makes it possible to perform an operation of paper resupply into the paper feed section 14 by the user during the job execution.

As a result, in a case where the number of remaining pieces of paper in the paper feed section 14 is insufficient for the job execution even in a state in which the paper P is full in the paper feed section 14, it is possible to, while carrying out each job without delay to a maximum extent after notifying a job completion time to the user, give the user with motivation for the paper resupply into the paper feed section 14, and then as long as the paper resupply is performed by the user, perform a print operation by one or a plurality of jobs which require a number of pieces of paper exceeding the maximum number of pieces of paper storable by the paper feed section 14 without stopping the job processing performed by the image forming apparatus 1.

Moreover, upon judgment that the number of remaining pieces of paper in the paper feed section 14 has become smaller than the number of prints required for executing all the jobs on standby as a result of adding a new job to the job management section 101 and adding a number of prints required for executing this new job, the control section 100 may notify a message urging the paper resupply in S19 above to the computer which has transmitted this new job.

As a result, the user who has inputted the job resulting in paper shortage is urged to perform paper resupply, thus avoiding a situation that any user who has inputted another job not resulting in paper shortage is urged to perform paper resupply.

Figure 7:
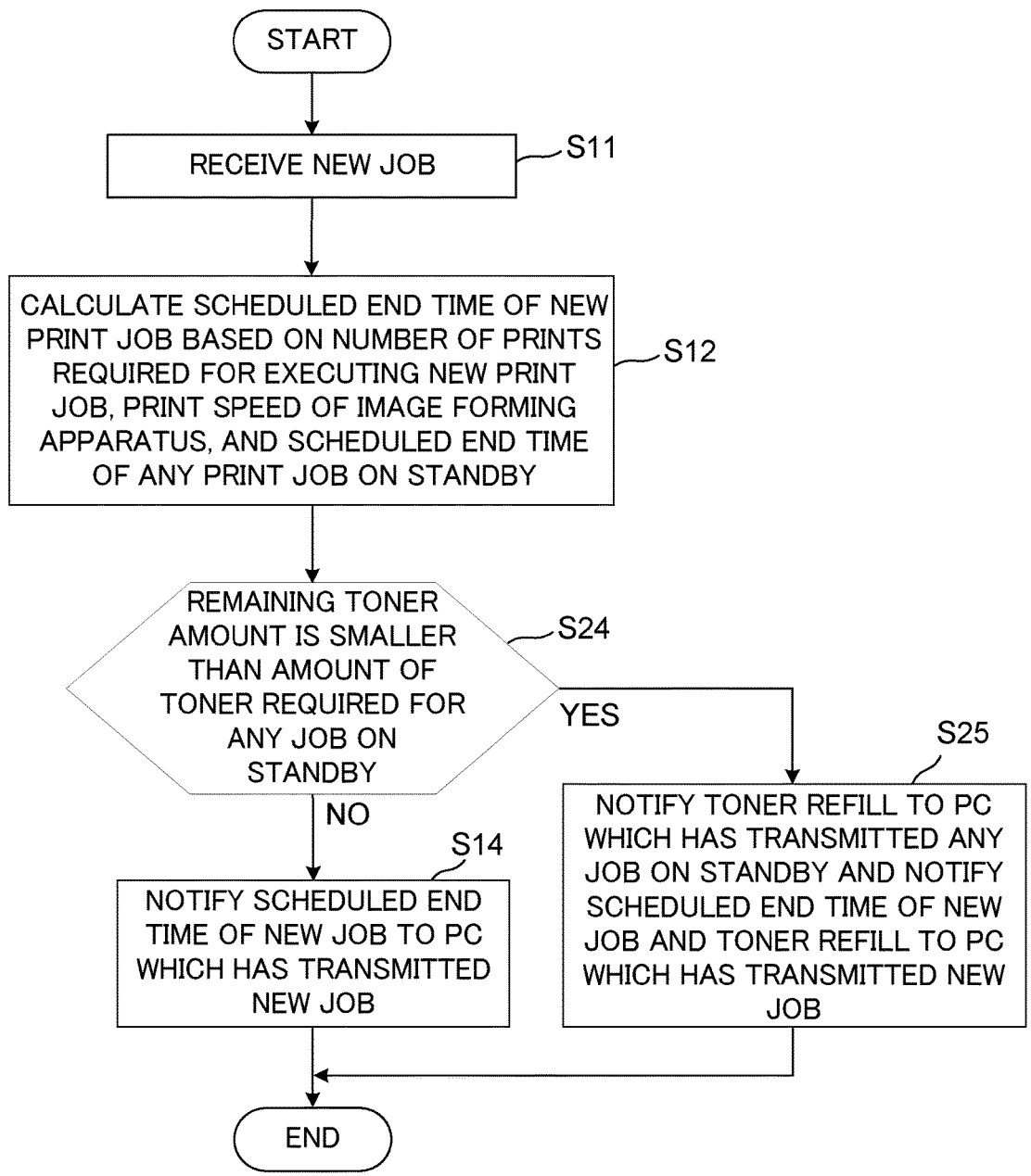
FIG. 7 is a flowchart showing processing of notifying a scheduled job end time by the image forming apparatus according to a fourth embodiment.

Next, a fourth embodiment of the processing of notifying a scheduled job end time by the image forming apparatus 1 will be described. FIG. 7 is a flow chart showing the fourth embodiment of the processing of notifying the scheduled job end time by the image forming apparatus 1.

In the fourth embodiment, in the processing of notifying the scheduled job end time shown in the flowchart of FIG. 3, along with the calculation of the scheduled end time of a new job, it may be further confirmed whether or not a toner used for print processing (image formation processing) of the job is remaining in a toner container (not shown). This fourth embodiment refers to a flow chart in which in addition to the first embodiment described above, this remaining toner amount confirmation processing is added to the processing of notifying the scheduled job end time.

The description will be given with reference to FIG. 7. Upon transmission of a new job from the computer 200, the job management section 101 of the image forming apparatus 1 receives this new job and registers it into a print queue (S11).

The control section 100, based on a number of prints required for executing the new job received by the job management section 101, the print speed of the image forming apparatus 1, and a scheduled end time of any other job on standby, calculates a scheduled end time of this new job (S12).

Moreover, the control section 100 makes comparison between an remaining amount of toner in a developing device of the image formation section 12 and an amount of toner required for executing all of the new job described above and any job on standby, and upon judgment that the remaining amount of toner in the developing device is smaller than the amount of toner required for executing all the jobs (YES in S24), notifies, via the network interface section 91, information indicating necessity of toner refill to the computer 200 which has transmitted any other job on standby, and notifies the information indicating the necessity of toner refill, together with the scheduled end time of this new job, to the computer 200 which has transmitted the new job (S25).

Applicable to detection of the remaining amount of toner in the developing device is a well-known detection method based on a signal from, for example, a remaining toner amount detection sensor attached to the developing device. Moreover, applicable to calculation of the amount of toner required for the job execution is a known toner amount calculation method such as calculation of a required toner amount based on, for example, a number of dots forming print data to be processed by the job and resolution.

As described above, in a case where the remaining amount of toner stored in the developing device is smaller than the amount of toner required for all the jobs described above, the toner refill can be notified to each of the computer 200 which has transmitted any job on standby and the computer 200 which has transmitted the new job to thereby urge any user waiting for printing to perform the toner refill.

In S22, the information indicating the necessity of toner refill is notified to both the computer 200 which has transmitted any job on standby and the computer 200 which has transmitted the new job, but the information indicating the necessity of toner refill may be notified to at least either one of the computer 200 which has transmitted any job on standby and the computer 200 which has transmitted the new job. This can also urge the user of the computer 200, to which the information indicating the necessity of toner refill has been notified, to perform the toner refill.

On the other hand, if the remaining amount of toner in the developing device is larger than the amount of toner required for executing any job on standby (NO in S21, the control section 100 notifies the scheduled end time of this new job to the computer 200 which has transmitted this new job without notifying the toner refill described above to any other computers 200 (S14).

As described above, according to this embodiment, the accurate scheduled job end time can be calculated accurately, and the accurate scheduled job end time can be notified to the computer 200 which has transmitted the job. As a result, the user who has transmitted the final job can accurately recognize the end time of his or her own job, and thus can go to the image forming apparatus to take out his or her printed material without waiting in front of the image forming apparatus until completion of print processing of the job of any other user, which improves user convenience.

For example, with the above job management technology described in BACKGROUND, the scheduled end time of the job is calculated based on the number of prints required for executing this job. However, the scheduled job end time calculated based on only the number of prints lacks in accuracy. On the contrary, this embodiment can resolve such a problem.

This disclosure is not limited to the configuration of the embodiments described above and various modifications thereto are permitted. For example, in the embodiments described above, upon reception of a new job, the image forming apparatus 1 calculates a scheduled end time of this new job and promptly notifies this scheduled end time of the new job to the computer 200 as an origin of this transmission, but it may further notify information indicating a job end to the computer 200 as the origin of the transmission immediately before or after end of this new job. Moreover, on an image forming apparatus 1 side, the control section 100 may provide displays of paper resupply and toner refill at the display section 473 in conjunction with the notification of the paper resupply and toner refill.

Moreover, the multifunction peripheral is used as one embodiment of the image forming apparatus according to this disclosure for the description, but this is only one example and a different image forming apparatus such as a printer may be used.

Moreover, the configuration and the processing shown by the embodiments described above with reference to FIGS. 1 to 7 are each just one embodiment of this disclosure, and this disclosure is not intended to be limited to this configuration and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. An image forming apparatus connected to a plurality of computers via a network, the image forming apparatus comprising:

an image formation section including units for every color for color printing, each of the units having a charging device, an exposure device, a developing device, and a photoconductive drum, a network interface section being formed of a communication module and performing transmission and reception of various pieces of data to and from with the plurality of computers;

a control unit being composed of a central processing unit, a random access memory, and a read only memory, and being in charge of overall operation control of the image forming apparatus;

a paper feed section feeding paper towards the image formation section; and a remaining paper amount detection section detecting a number of remaining pieces of paper stored in the paper feed section, wherein the central processing unit of the control unit executes:

processing of receiving and spooling each of jobs received from the plurality of computers and processing of managing each of the jobs, processing of each of the managing jobs sequentially, and upon reception of a new job from any one of the plurality of computers, processing of calculating a scheduled end time at which the new job ends based on a number of prints required for executing the new job, a print speed of the image forming apparatus, and a scheduled end time of the spooled job on standby, and notification processing, in which the calculated scheduled end time is notified via the network interface section to the computer which has transmitted the new job, the central processing unit of the control unit further executes: processing of making comparison between the number of remaining pieces of paper detected by the remaining paper amount detection section and a number of prints required for executing the job on standby; and upon judgment that the number of remaining pieces of paper is smaller than the number of prints required, notification processing, in which information indicating necessity of paper resupply is notified via the network interface section to at least either one of the computer which has transmitted the job on standby and the computer which has transmitted the new job.

2. The image forming apparatus according to claim 1, wherein, upon judgment that the number of remaining pieces detected by the remaining paper amount detection section is a value within a given range from a predefined maximum number of pieces storable in the paper feed section and the number of remaining pieces is smaller than the number of prints required for executing the job on standby, when the image forming apparatus has turned into a predefined state in which paper feed to the paper feed section can be performed, the central processing unit of the control unit executes notification processing, in which a message of paper resupply is notified via the network interface section to at least either one of the computer which has transmitted the job on standby and the computer which has transmitted the new job.

3. The image forming apparatus according to claim 2, wherein the central processing unit of the control unit executes: processing of analyzing contents of each of the managing jobs; processing of extracting the job not accompanied by processing performed by the image formation section; processing of calculating a required period necessary for processing the extracted job; and upon judgement that the calculated required period has reached a predefined period, at a time point at which execution of the processing of the extracted job starts, which time point is defined as a moment of turning into the state in which the paper feed can be performed, notification processing, in which the message of paper resupply is notified via the network interface section to at least either one of the computer which has transmitted the job on standby and the computer which has transmitted the new job, and the central processing unit of the control unit further performs control of continuing the processing of the job even when the paper feed section is opened or closed from a main body of the image forming apparatus during the processing of the job.

4. The image forming apparatus according to claim 3, wherein, upon extraction of the plurality of jobs which are not accompanied by the processing performed by the image formation section and which are consecutive in execution order, the central processing unit of the control unit executes processing of calculating, as the required period, a total of periods required for completing the respective jobs.

5. The image forming apparatus according to claim 3, wherein, upon judgement that the number of remaining pieces of paper in the paper feed section has become smaller than the number of prints required for executing all the jobs on standby as a result of adding the new job and adding the number of prints required for executing the new job, the central processing unit of the control unit executes notification processing, in which the message of paper resupply is notified via the network interface section to the computer which has transmitted the new job.

6. An image forming apparatus connected to a plurality of computers via a network, the image forming apparatus comprising:

an image formation section including units for every color for color printing, each of the units having a charging device, an exposure device, a developing device, and a photoconductive drum, a network interface section being formed of a communication module and performing transmission and reception of various pieces of data to and from with the plurality of computers; and a control unit being composed of a central processing unit, a random access memory, and a read only memory, and being in charge of overall operation control of the image forming apparatus;

wherein the central processing unit of the control unit executes:

processing of receiving and spooling each of jobs received from the plurality of computers and processing of managing each of the jobs, processing of each of the managing jobs sequentially, and upon reception of a new job from any one of the plurality of computers, processing of calculating a scheduled end time at which the new job ends based on a number of prints required for executing the new job, a print speed of the image forming apparatus, and a scheduled end time of the spooled job on standby, and notification processing, in which the calculated scheduled end time is notified via the network interface section to the computer which has transmitted the new job, the central processing unit of the control unit further executes: processing of making comparison between a remaining amount of toner stored in a developing device included in the image formation section and an amount of toner required for executing the job on standby; and upon judgment that the remaining amount of toner stored is smaller than the amount of toner required, notification processing, in which information indicating necessity of toner refill is notified via the network interface section to at least either one of the computer which has transmitted the job on standby and the computer which has transmitted the new job.

* * * * *